United States Patent
Chen

(10) Patent No.: US 9,773,088 B2
(45) Date of Patent: Sep. 26, 2017

(54) METHOD OF MODELING THE TEMPERATURE PROFILE OF AN IC TRANSISTOR JUNCTION

(71) Applicant: TELEDYNE SCIENTIFIC & IMAGING, LLC, Thousand Oaks, CA (US)

(72) Inventor: Bing-Chung Chen, Newbury Park, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 28 days.

(21) Appl. No.: 14/943,832

(22) Filed: Nov. 17, 2015

(65) Prior Publication Data
US 2016/0328512 A1     Nov. 10, 2016

Related U.S. Application Data

(60) Provisional application No. 62/080,602, filed on Nov. 17, 2014.

(51) Int. Cl.
    *G06F 17/50*      (2006.01)

(52) U.S. Cl.
    CPC ...... *G06F 17/5081* (2013.01); *G06F 17/5036* (2013.01); *G06F 2217/80* (2013.01)

(58) Field of Classification Search
    USPC ........................................................ 716/111
See application file for complete search history.

(56) References Cited

U.S. PATENT DOCUMENTS

| | | | |
|---|---|---|---|
| 2003/0040130 A1* | 2/2003 | Mayur | G06F 17/5018 438/14 |
| 2009/0019411 A1* | 1/2009 | Chandra | G06F 17/5009 716/119 |
| 2009/0024347 A1* | 1/2009 | Chandra | G06F 17/5036 702/130 |
| 2010/0314723 A1* | 12/2010 | Schmidt | B26F 1/28 257/629 |
| 2013/0147050 A1* | 6/2013 | Bonner, III | H01L 29/7786 257/773 |

* cited by examiner

*Primary Examiner* — Mohammed Alam
(74) *Attorney, Agent, or Firm* — Koppel, Patrick, Heybl & Philpott

(57) ABSTRACT

A method of modeling the temperature profile of an IC transistor junction employs an efficient thermal simulation algorithm to implement a design tool for IC design applications. The junction area of a transistor is divided into an odd number of sub-sections of equal size. Each sub-section is modeled as an equivalent circular heat source having an area equal to that of a sub-section. Temperature profiles are determined for each of the equivalent circular heat sources, which are superimposed to provide a total thermal profile for the junction. The method is preferably employed with rectangular-shaped junction areas, and performed with a software-controlled microprocessor. The method may be integrated with an electronic circuit simulation program such as SPICE. The results of the modeling may be used to iteratively modify the component layout on an IC to improve its temperature performance and/or its component density.

11 Claims, 3 Drawing Sheets

$$R_{th} = \frac{c}{abk_{th}} + \frac{2}{abl_x k_{th}} \sum_{m=1}^{\infty} \frac{1}{\beta_m^2} \tanh(\beta_m c)\cos(\beta_m x_f)$$

$$+ \frac{2}{abl_y k_{th}} \sum_{n=1}^{\infty} \frac{1}{v_n^2} \tanh(v_m c)\cos(v_n y_f) G$$

$$+ \frac{2}{abl_x l_y k_{th}} \sum_{m=1}^{\infty} \sum_{n=1}^{\infty} \frac{1}{\beta_m v_n \gamma_{mn}} \tanh(\gamma_{mn} c)\cos(\beta_m x_f)\cos(v_n y_f) FG$$

| ASP Ratio | Mesh-Based Tmax | Equivalent Area sol | err % | Present Method | err % |
|---|---|---|---|---|---|
| 20 | 107.13 | 126.40 | 17.99% | 107.79 | 0.62% |
| 15 | 109.42 | 126.40 | 15.52% | 109.71 | 0.27% |
| 10 | 112.92 | 126.40 | 11.94% | 113.10 | 0.16% |
| 8 | 114.85 | 126.40 | 10.06% | 115.33 | 0.42% |
| 6 | 117.02 | 126.40 | 8.01% | 117.85 | 0.71% |
| 4 | 120.21 | 126.40 | 5.15% | 120.16 | -0.05% |
| 2 | 124.35 | 126.40 | 1.65% | 126.40 | 1.65% |
| 1 | 126.03 | 126.40 | 0.30% | 126.40 | 0.30% |

METHOD OF MODELING THE TEMPERATURE PROFILE OF AN IC TRANSISTOR JUNCTION

RELATED APPLICATIONS

This application claims the benefit of provisional patent application No. 62/080,602 to Bing-Chung Chen, filed Nov. 17, 2014.

GOVERNMENT LICENSE RIGHTS

This invention was made with Government support under contract FA8650-13-C-7315 awarded by the Defense Advanced Research Projects Agency (DARPA). The Government has certain rights in this invention.

BACKGROUND OF THE INVENTION

Field of the Invention

This invention relates to the thermal modeling of semiconductor junctions, and more particularly to modeling the temperature profiles of transistor junctions on an integrated circuit (IC).

Description of the Related Art

The quest for an accurate understanding of the thermal properties of integrated semiconductor devices is driven both by a need for more efficient modeling of these devices for circuit level simulation, and also for reliability concerns. For example, a complete theoretical determination of the junction temperature near a high power transistor requires the coupled simulation of both the semiconductor device's electric equations and the heat equation. This combined electro-thermal problem is a significant challenge. A major feature of the heat problem is the need to simulate a very large region of the device and substrate; the length scale of a substrate is on the order of several millimeters, while the geometrical features of the transistor are in the micron or sub-micron range.

ICs containing high power electronics often consist of multiple rectangular-shaped field transistors (also referred to as "finger-shaped" transistors), such as the high-electron-mobility transistors (HEMTs) or heterojunction bipolar transistors (HBTs). For example, gallium nitride (GaN) integrated transistor devices often have a heat source area as small as ~0.5×150 $\mu m^2$, with a large aspect ratio (length-over-width) for each gate finger, and a substrate base as large as ~2×2 $mm^2$. One state-of-the-art method of determining thermal performance employs finite element analysis (FEA) or finite volume analysis (FVA) models. However, the wide difference in geometric scale noted above requires a very fine mesh near the heat sources to achieve accurate results from these mesh-based discretization computation models. A large number of meshed elements are required to ensure convergence of the solution, particularly when the relevant length scales of the heat sources vary significantly in the domain of interest. In particular, when the number of heat sources increase in a practical IC design, the mesh-size can grow to millions of degrees of freedom (DOFs), making rendering an efficient computation solution impractical.

On the other hand, an analytical solution of a Fourier series expansion requires a large number of terms to converge. As illustrated in FIGS. 1a-1d, the widely used analytical model solves for the temperature at the surface of a source plane consisting of multiple rectangular-shape transistor heat sources (such as transistor heat source 10 in FIG. 1a, also referred to herein as 'finger-shaped' or 'a finger') located on a rectangular prism domain of a substrate 12, with heat source 10 having a length $l_y$ and a width $l_x$. The Fourier series expansion solution (FIG. 1b) consists of three infinite series summations, with two single summation terms and one double-summation term. Five such fingers are illustrated in FIG. 1c, with temperatures calculated across the substrate shown in FIG. 1d. It was reported in the literature that more than $10^{10}$ summation terms (m=$10^5$, n=$10^5$ terms, in the double series summation) are required to achieve a solution accuracy of 0.1% (see, e.g., Y. S. Muzychka, K. R. Bagnall, and E. N. Wang. "Thermal spreading resistance and heat source temperature in compound orthotropic systems with interfacial resistance," IEEE Trans. Components, Packaging, and Manufacturing Technology, vol. 3, no. 11, Nov. 2013, pp. 1826-1841). As a result, the analytical solution of a Fourier series expansion with a double-summation term is not practical for efficient thermal simulation of ICs with finger-shaped transistors having high aspect ratios.

Integrated circuit designers often choose to adopt conservative layouts when designing such high power circuits, due to uncertainty with respect to the thermal coupling effect between transistors, overall device performance, and reliability. As a result, a circuit layout that provides optimal circuit performance may be impractically large.

SUMMARY OF THE INVENTION

A method of modeling the temperature profile of an IC transistor junction is presented which addresses several of the issues noted above.

The described method employs an efficient thermal simulation algorithm to implement a design tool for IC design applications, in particular for high power density and high frequency electronics. The method uses a hybrid analytical-numerical approach to perform thermal simulation in an efficient manner, making fast calculations of the transistor junction temperatures possible. The method requires dividing high aspect-ratio transistors (i.e., heat sources) into multiple equal-sized heat sources whose equivalent thermal profiles can be efficiently characterized as circular heat sources, and then superimposing the total thermal profiles of the sub-divided transistors to obtain the thermal profiles of the high aspect-ratio transistors. This approach efficiently supports temperature-aware IC design. The underlying algorithm avoids the high computation cost of a double-Fourier-series-expansion solution, which involves a large number of summation terms to achieve sufficient accuracy for high aspect-ratio heat sources.

In practice, the present method requires first receiving geometry and position data associated with a transistor's junction area. The junction area is then divided into an odd number of sub-sections of equal size, each of which has an aspect ratio of less than 2. Each sub-section is modeled as an equivalent circular heat source having an area equal to that of a sub-section. Temperature profiles are determined for each of the equivalent circular heat sources, which are superimposed to provide a total thermal profile for the junction. Modeling each sub-section preferably comprises finding the self-heating and mutual heat thermal resistance for each sub-section.

The method is preferably employed with rectangular-shaped junction areas, and is preferably performed with a software-controlled microprocessor. The present modeling may be integrated with an IC electronic circuit simulation program, such as SPICE. The results of the modeling may be used to iteratively modify the component layout on an IC to improve its temperature performance and/or its component density.

Further features and advantages of the invention will be apparent to those skilled in the art from the following detailed description, taken together with the accompanying drawings.

BRIEF DESCRIPTION OF THE DRAWINGS

FIG. 1a is a perspective view of a transistor heat source on substrate.

FIG. 1b is a known Fourier-series expansion solution for determining the temperature profile of the transistor heat source shown in FIG. 1a.

DETAILED DESCRIPTION OF THE INVENTION

A complete determination of junction temperature near a high power transistor requires the coupled simulation of both the semiconductor device's electric equations and the heat equation. A major feature of the heat problem is the need to simulate a very large region of the device, despite the fine details of the transistors. IC designers call for an efficient thermal simulation tool in support of a temperature-aware circuit design, which becomes critical for high power and high frequency electronics applications.

Figures 1A, 1B:
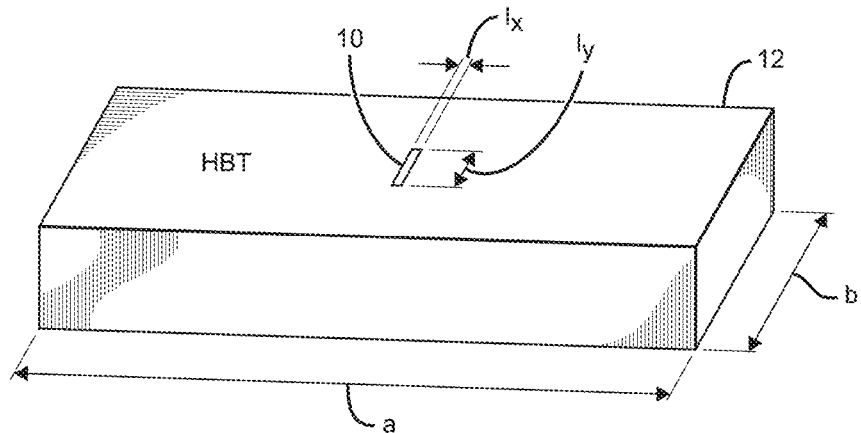
Figure 1D:
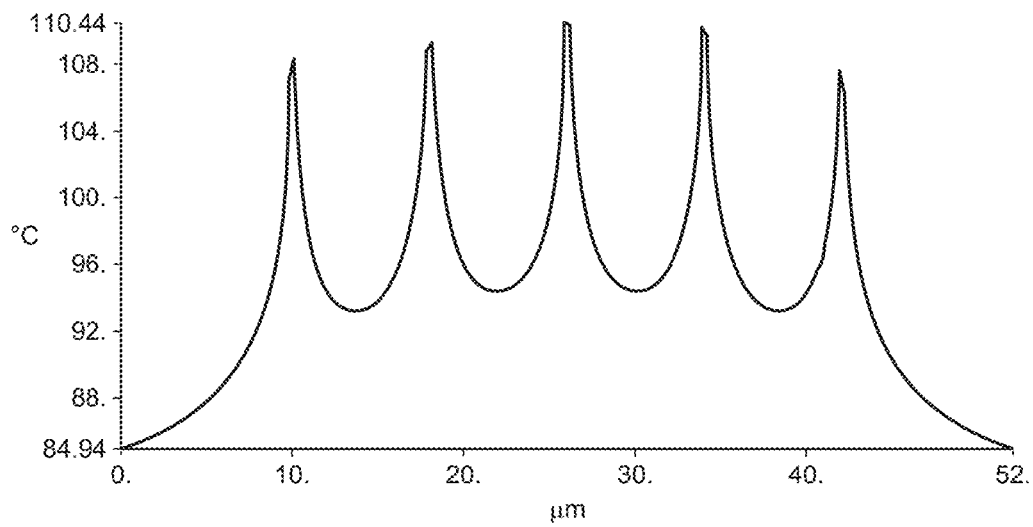
FIG. 1d is a graph illustrating temperatures across the substrate shown in FIG. 1c.
Figure 1C:
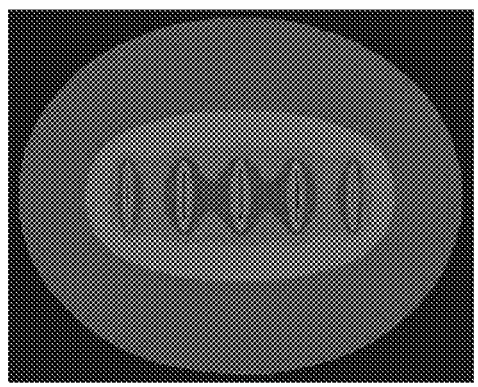
FIG. 1c is a diagram illustrating a substrate with five heat 'fingers'.
Figure 2:
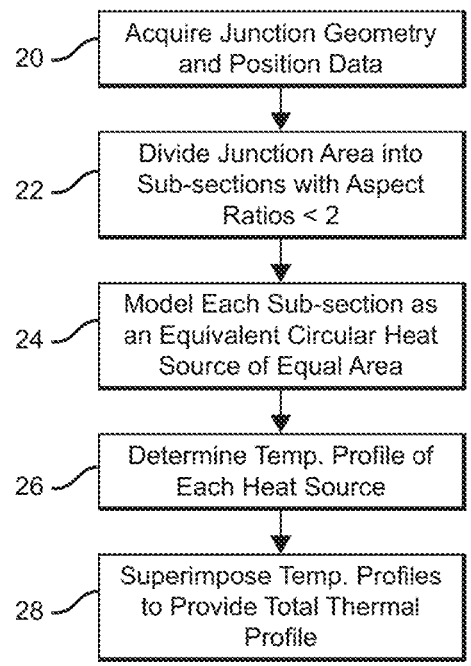
FIG. 2 is a flow chart illustrating the steps of the present temperature profile modeling method.

The present method is shown in FIG. 2. As a first step (20), geometry and position data associated with the transistor junction area of interest is acquired. The junction area is then divided into an odd number of sub-sections of equal size, with each of the sub-sections having an aspect ratio of less than two, and preferably close to one (22).

The temperature profile of a near square-shaped heat source can be accurately approximated as an equivalent circular heat source of equal area whose temperature profile can be obtained in cylindrical coordinates. Thus, the next step is to model each sub-section as an equivalent circular heat source having an area equal to that of a sub-section (24). In step 26, the temperature profiles for each of the equivalent circular heat sources are determined. The temperature profiles are then superimposed (28) to provide a total thermal profile for the junction.

Figures 3, 4:
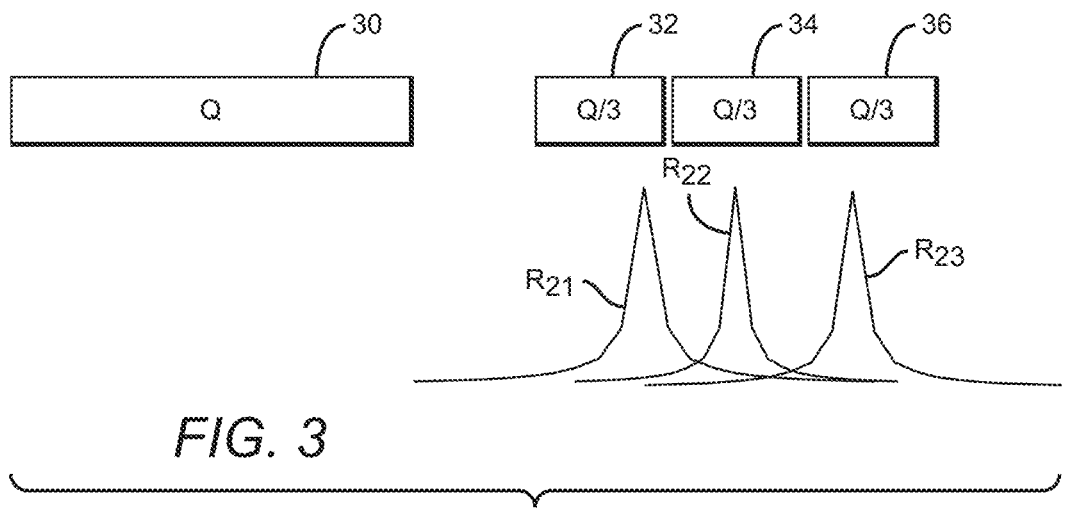
FIG. 3 is a diagram illustrating several of the steps of the present temperature profile modeling method.
FIG. 4 is a table containing results of a benchmark test comparing the use of the present temperature profile modeling method with a state-of-the-art mesh-based finite element analysis (FEA) method.

An illustrated example is shown in FIG. 3 for a rectangular-shaped heat source. The total thermal profile of an underlying near square-shaped heat source 30 (also referred to herein as 'finger-shaped' or 'rectangular-shaped'). The heat source 30 is first sub-divided into three equal-shaped sub-divisions 32, 34, 36, each having an aspect ratio of less than two, and preferably close to one. The heat loading of each sub-divided heat source is the total heat loading divided by the number of sub-divided heat sources. When using the central unit of the sub-divided heat source as the representative temperature of the underlying finger-shaped heat source, the effective thermal resistor is the arithmetic mean of the self-heating thermal resistor of the central unit and all its neighboring mutual-heating thermal resistors. It is noted that because of the symmetrical pattern of the sub-divided heat sources, only half of the mutual-heating thermal resistors computation need to be calculated. Thus, in FIG. 3, the overall effective thermal resistance is the arithmetic means of the self-heating thermal resistance $R_{22}$ of sub-division 34 and the mutual-heating resistances $R_{21}$ and $R_{23}$ associated with neighboring sub-divisions 32 and 36, respectively.

The results of a benchmark test comparing the use of the present method with a state-of-the-art mesh-based finite element analysis (FEA) and a known "equivalent area" approach for different aspect ratios is shown in FIG. 4. For this example, the IC substrate is indium phosphide (InP) whose thermal conductivity is temperature-dependent; the benchmark model consisted of 41 heating sources. Very fine meshes near the heat sources are required to achieve accurate results. Due to the large numbers of degrees of freedom associated with high density meshes and the nonlinearity associated with temperature-dependent thermal conductivity, the solution time for this medium-scaled FE model takes over 150 seconds. On the other hand, the solution time using the present converted thermal network model is less than 0.2 second and clearly demonstrates the solution efficiency of this hybrid analytical-numerical approach to perform thermal simulation for fast calculations of the transistor junction temperatures.

When the present method is practiced as described above, i.e., with a finger-shaped junction divided into first, second and third subsections with the second subsection in the center of the transistor junction area, and with the equivalent temperature for the second sub-section being $T_2$, the equivalent temperature for the first sub-section being $T_1$, and the equivalent temperature for the third sub-section being $T_3$, then $T_1$, $T_2$, and $T_3$ are given by:

$$\begin{Bmatrix} T_1 \\ T_2 \\ T_3 \end{Bmatrix} = \begin{bmatrix} R_{11} & R_{12} & R_{13} \\ R_{21} & R_{22} & R_{23} \\ R_{31} & R_{32} & R_{33} \end{bmatrix} \begin{Bmatrix} Q/3 \\ Q/3 \\ Q/3 \end{Bmatrix}$$

$$T_2 = \left( \frac{R_{21} + R_{22} + R_{23}}{3} \right) Q$$

where $R_{11}$, $R_{22}$, $R_{33}$ are the self-heating thermal resistances for first, second and third sub-sections, respectively, $R_{12}$ and $R_{13}$ are the mutual-heating thermal resistances for the second and third sub-sections, respectively, with respect to the first sub-section, $R_{21}$ and $R_{23}$ are the mutual-heating thermal resistances for the first and third sub-sections, respectively, with respect to the second sub-section, and $R_{31}$ and $R_{32}$ are the mutual-heating thermal resistances for the first and second sub-sections, respectively, with respect to the third sub-section.

The present method is much more efficient that prior art methods. For example, a mesh-based approach as described above may require a million or more mesh elements, with a corresponding computation time being several minutes to several hours. In contrast, the present method employs no mesh elements, and requires a computation time of well under a minute.

A typical IC has many transistor junctions which are arranged in a particular layout on the IC die. The present method may be used to determine the total thermal profiles for multiple junctions. That data can in turn be used to modify the layout, typically in an effort to improve the IC's thermal performance or increase the IC's component density. This process of using the present method to determine the total thermal profiles and then modifying the layout in response can be performed iteratively. For example, an IC may be required to meet a particular thermal performance or component density specification. The process described above could be performed iteratively until a layout is arrived at which enables the specification to be met.

The present method of modeling the temperature profile of an IC transistor junction might advantageously be integrated with an IC electronic circuit simulation program, such as SPICE. This would efficiently facilitate the iterative process described above. In addition to helping establish a component layout, temperature profile data obtained as described herein may be used by a circuit simulation program to influence a number of different design aspects.

The present method is preferably performed with a software-controlled microprocessor; a computer program which contains the software would be stored on a computer readable storage medium. Such a program would be arranged to carry out the process steps outlined in FIG. 2. It could further be arranged to operate the processor to perform electronic circuit simulation as described above, with the present method and the simulation software integrated into a single program.

The present method finds application as a temperature-aware circuit design layout tool for semiconductor devices, particularly for high speed, high power applications. The method provides a closed-form solution with high efficiency and high fidelity, which accounts for both self-heating and mutual-heating effects. In practice, the method operates on circuit design data such as component geometry and dimensions, component type, component location, spacing, etc. This data can be acquired by, for example, manual entry, or by being exported from an Electronic Design Automation (EDA) product. The method can also be integrated into EDA products as a thermal-aware circuit design tool—thereby providing a simulation tool for large-scale thermal-aware circuit design with short turn-around time. Integrating the method into the circuit design process in this way enables near-instant thermal performance feedback when circuit design changes are made. The ability to make quick design change iterations in this way enables the circuit design variables—such as circuit layout, component spacing, etc.— to be quickly optimized on the fly.

While particular embodiments of the invention have been shown and described, numerous variations and alternate embodiments will occur to those skilled in the art. Accordingly, it is intended that the invention be limited only in terms of the appended claims.

I claim:

1. A computer readable storage medium having stored thereon a computer program for modeling the temperature profile of an integrated circuit (IC) transistor junction, said program arranged to operate a processor to perform a method comprising:
   receiving geometry and position data associated with the junction area;
   dividing the junction area into an odd number of sub-sections of equal size, each of said sub-sections having an aspect ratio of less than 2;
   modeling each sub-section as an equivalent circular heat source having an area equal to that of a sub-section;
   determining temperature profiles for each of said equivalent circular heat sources; and
   superimposing the temperature profiles of said equivalent circular heat sources to provide a total thermal profile for said junction;
   wherein said sub-sections comprise first, second and third subsections with said second subsection in the center of said junction area, with the equivalent temperature for the second sub-section being $T_2$, the equivalent temperature for the first sub-section being $T_1$, and the equivalent temperature for the third sub-section being $T_3$, defined by:

$$\begin{Bmatrix} T_1 \\ T_2 \\ T_3 \end{Bmatrix} = \begin{bmatrix} R_{11} & R_{12} & R_{13} \\ R_{21} & R_{22} & R_{23} \\ R_{31} & R_{32} & R_{33} \end{bmatrix} \begin{Bmatrix} Q/3 \\ Q/3 \\ Q/3 \end{Bmatrix}$$

$$T_2 = \left(\frac{R_{21} + R_{22} + R_{23}}{3}\right)Q$$

where $R_{11}$, $R_{22}$, $R_{33}$ are the self-heating thermal resistances for first, second and third sub-sections, respectively,
$R_{12}$ and $R_{13}$ are the mutual-heating thermal resistances for the second and third sub-sections, respectively, with respect to said first sub-section,
$R_{21}$ and $R_{23}$ are the mutual-heating thermal resistances for the first and third sub-sections, respectively, with respect to said second sub-section, and
$R_{31}$ and $R_{32}$ are the mutual-heating thermal resistances for the first and second sub-sections, respectively, with respect to said third sub-section.

2. The method of claim 1, wherein modeling each sub-section comprises finding the self-heating and mutual heat thermal resistance for each sub-section.

3. The method of claim 1, wherein said junction area is rectangular-shaped.

4. The method of claim 1, wherein said method is performed with a software-controlled microprocessor.

5. The method of claim 1, wherein said IC includes multiple ones of said transistor junctions arranged in a particular layout, further comprising modifying said layout in response to said total thermal profile.

6. The method of claim 1, wherein said method of modeling the temperature profile of an IC transistor junction is integrated with an IC electronic circuit simulation program.

7. The method of claim 6, wherein said IC electronic circuit simulation program is SPICE.

8. The computer readable storage medium of claim 1, said medium having further stored thereon a computer program arranged to operate said processor to perform a method for simulating the operation of electronic circuits on an IC.

9. The computer readable storage medium of claim 8, wherein said computer program for modeling the temperature profile of an IC transistor junction is integrated with said computer program for simulating the operation of electronic circuits on an IC.

10. A temperature-aware circuit design layout tool for use when designing integrated circuits (ICs), comprising:
    a computer readable storage medium having stored thereon a computer program, said program arranged to:
    operate a processor to perform a method of modeling the temperature profile of transistor junctions on said IC, comprising:
    receiving geometry and position data associated with the junction area;

dividing the junction area into an odd number of sub-sections of equal size, each of said sub-sections having an aspect ratio of less than 2;

modeling each sub-section as an equivalent circular heat source having an area equal to that of a sub-section;

determining temperature profiles for each of said equivalent circular heat sources; and superimposing the temperature profiles of said equivalent circular heat sources to provide a total thermal profile for said junction;

wherein said sub-sections comprise first, second and third subsections with said second subsection in the center of said junction area, with the equivalent temperature for the second sub-section being $T_2$, the equivalent temperature for the first sub-section being $T_1$, and the equivalent temperature for the third sub-section being $T_3$, defined by:

$$\begin{Bmatrix} T_1 \\ T_2 \\ T_3 \end{Bmatrix} = \begin{bmatrix} R_{11} & R_{12} & R_{13} \\ R_{21} & R_{22} & R_{23} \\ R_{31} & R_{32} & R_{33} \end{bmatrix} \begin{Bmatrix} Q/3 \\ Q/3 \\ Q/3 \end{Bmatrix}$$

$$T_2 = \left( \frac{R_{21} + R_{22} + R_{23}}{3} \right) Q$$

where $R_{11}$, $R_{22}$, $R_{33}$ are the self-heating thermal resistances for first, second and third sub-sections, respectively, $R_{12}$ and $R_{13}$ are the mutual-heating thermal resistances for the second and third sub-sections, respectively, with respect to said first sub-section, $R_{21}$ and $R_{23}$ are the mutual-heating thermal resistances for the first and third sub-sections, respectively, with respect to said second sub-section, and $R_{31}$ and $R_{32}$ are the mutual-heating thermal resistances for the first and second sub-sections, respectively, with respect to said third sub-section; and operate said processor to perform a method for simulating the operation of electronic circuits on an ICU.

11. The temperature-aware circuit design layout tool of claim 10, said computer program arranged such that said temperature profiles are provided to and used by said circuit simulation method, thereby enabling an IC design to be iteratively modified such that one or more circuit layout variables can be optimized.

* * * * *